United States Patent [19]

Karning et al.

[11] Patent Number: 4,472,809
[45] Date of Patent: Sep. 18, 1984

[54] HYBRID LASER

[76] Inventors: Heinrich Karning, Alb.-Fritz-Str. 6, 6900 Heidelberg; Franz Prein, Tulpenweg 3, 6901 Waldhilsbach, both of Fed. Rep. of Germany

[21] Appl. No.: 329,269
[22] PCT Filed: Jan. 24, 1981
[86] PCT No.: PCT/DE81/00022
§ 371 Date: Dec. 4, 1981
§ 102(e) Date: Dec. 4, 1981
[87] PCT Pub. No.: WO81/02955
PCT Pub. Date: Oct. 15, 1981

[30] Foreign Application Priority Data

Apr. 5, 1980 [DE] Fed. Rep. of Germany ....... 3013303

[51] Int. Cl.$^3$ ............................................. H01S 3/082
[52] U.S. Cl. ........................................ 372/97; 372/93; 372/68; 372/108; 372/87
[58] Field of Search ...................... 372/92, 97, 94, 93, 372/34, 83, 70, 55, 61, 62, 95, 107, 108, 87, 25, 68

[56] References Cited
U.S. PATENT DOCUMENTS 3,855,547  7/1974  Kirk ..................................... 372/93

OTHER PUBLICATIONS

"Compact Neon–Helium Laser with an Increased Power Rating" Bazylenko et al., Moscow State University, *Tekhnika Eksperimenta* No. 3, pp. 206–208 May–Jun. 1975.

Primary Examiner—William L. Sikes
Assistant Examiner—Léon Scott, Jr.
Attorney, Agent, or Firm—Handal & Morofsky

[57] ABSTRACT

A hybrid laser system, consisting of two different laser units, namely a reference laser (4), possibly an injection laser or a laser amplifier, and a transversely excited laser (TE-laser) (5), possibly a longitudinally pulsed or Q-switched laser, both lasers residing in a common housing. The first laser consists of a tube enclosing an isolated low pressure space and is bathed by coolant. The second laser is a high-pressure space enclosing a folded electrode system (14, 15). In order to achieve uniformity of temperature conditions and wavelength relations, both lasers share a common resonator volume (3) and are in fixed relative adjustment. The reference laser is used as a calibrating laser for frequency tuning of the resonator or, simultaneously, as a local oscillator, whereas the TE laser serves to generate a laser pulse.

20 Claims, 8 Drawing Figures

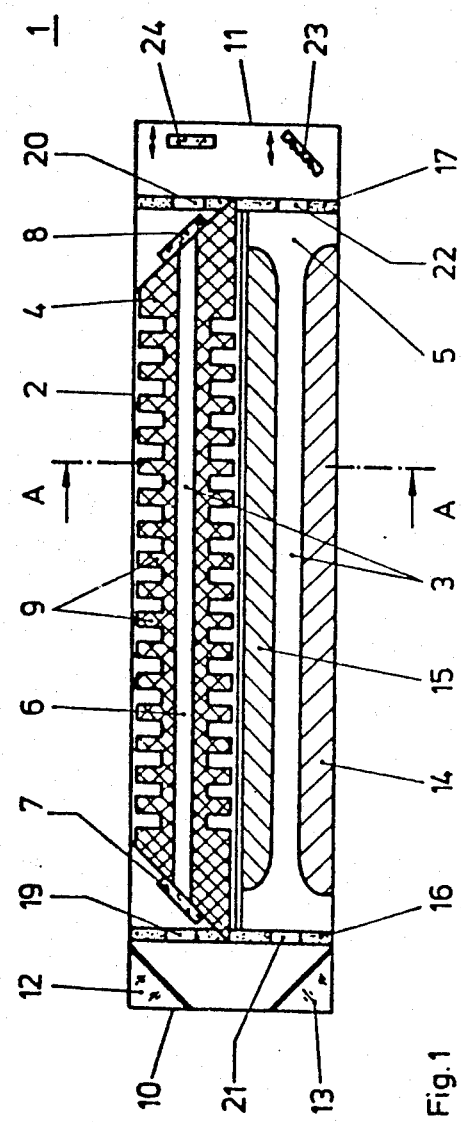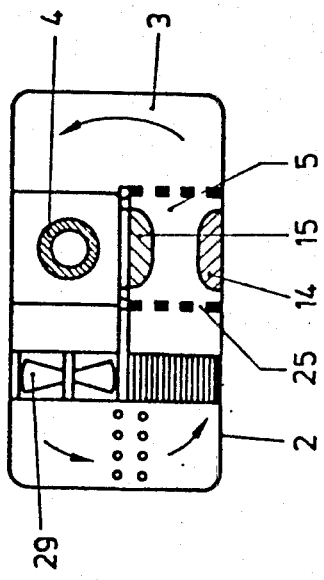

HYBRID LASER

The invention relates to a hybrid laser, consisting, firstly, of a reference laser, an injection laser or a laser amplifier and, secondly, of a TE-laser, or a longitudinally pulsed or Q-switched CW-laser. Both lasers share a common housing and resonator cavity and are disposed in mutually parallel alignment. They may operate at the same or at different wavelengths. Their discharge channels are placed in series by two deviators that face one another at one end of the system and by placement of a totally reflecting element in front of one channel and an at least partially transmitting element for extracting the beam out of the cavity, at the other end of the system. The lasers are operated in coherent superposition.

A laser of this type is described in the technical article "Frequency and amplitude characteristics of a high repetition rate hybrid TEA $CO_2$ laser by J. L. Lachambre, P. Lavigne, M. Verreault and G. Otis, appearing in IEEE Journal of Quantum Electronics, Vol QE-14, No. 3, March 1978, pages 170–177.

It is the object of the present invention to improve the uniformity of temperature conditions and the constancy of the wavelength relations relative to one another, in a laser system of the type to which the invention pertains, in which operation takes place at two identical or different wavelengths. This object is attained, according to the invention, in that the reference laser, the injection laser or the laser amplifier consists of a tube that encloses a separate pressure space and is bathed in coolant, while the TE laser or the pulsed laser consists of a high-pressure chamber connected to the resonator cavity and having at least two opposing electrodes. All laser elements including their optical components are disposed in fixed mutual relation. These steps insure temporal and spatial coherence for all wave forms so that all thermal and mechanical changes have the same effect on all lasers. The reference laser, injection laser or laser amplifier may be used in the various pulsed laser channels for producing a laser pulse, either simultaneously or at different times.

A further embodiment of the invention provides that the tube containing the reference laser, the injection laser or the laser amplifier be located centrally, with both long sides thereof being limited by corresponding sides of an at least once-folded beam path of the gas laser. Depending on the point where radiation is to be extracted, the channels formed by the electrodes must be terminated at one end by the deviating means and, at the other end, either by one totally reflecting optical element and one partially transmitting element or window, or by two totally reflecting elements. In conformance therewith, the tube containing the reference laser, the injection laser or the laser amplifier must be terminated at the end faces either by a totally reflecting optical element and an at least partially transmitting optical element, or by an element serving for deviation and extraction and a totally reflecting optical element or by an optical element that permits transmission of several wavelengths. Such laser systems are provided, especially, for remote gas analysis by the differential method. For example, the reflected partial laser beams can be used to determine the gas components in the air. Other possible uses are humidity measurements, air speed measurments on the basis of the Doppler-shift and others.

When used for these applications, it may be advantageous if the endface that holds the partially transmitting elements is adjustable in the longitudinal direction, for example, by means of a piezoelectric transducer. This permits a tuning of the resonator length with relatively small motions.

The gas lasers may be operated continuously (CW) or pulsed, using a waveguide laser or a conventional CW-laser, respectively. The energy supply must be continuous, for example, due to a continuous discharge. It will be understood that in such continuous extraction, the power level is lower. In such use, it is advantageous if the two associated lasers operate at different and separately tunable but mutually fixed wavelengths.

In the operation of hybrid laser, equalized temperatures in the different lasers are of basic importance. This condition is met, firstly, by the dispositon of cooling fins on the reference laser (or the injection laser or laser amplifier) and, secondly, by the integration of the two laser units in the same resonator volume, i.e., by spatial communication of the TE laser or pulsed laser with the resonator volume, which permits the use of the gas from this laser for heat transfer at the reference laser (or injection laser or laser amplifier).

The cooling system may consist, for example, of mutually parallel flat material in the form of cooling fins mounted perpendicular to the discharge channel and bathed in coolant. The use of a heat pipe is also possible. In order to enhance the flow of gas from the TE laser or pulsed laser along the outer walls of the other lasers, a blower in the resonator volume serves to exchange gas at higher pulse repetition rates.

A further embodiment of the invention provides for the disposition of a polarization-dependent extractor element for extracting the radiation from the reference laser (or injection laser or laser amplifier), located between these lasers and the deviating means. It also provides for the disposition of a selective absorber or polarizer and a wavelength-tunable optical element, for example a diffraction grating, in the path of the extracted beam.

Various embodiments of the invention will now be described in detail with the aid of the drawing in which similar parts carry the same reference numbers.

FIG. 1 is a lengthwise section through a hybrid laser according to the invention;

FIG. 2 is a section along AA in FIG. 1;

Figure 3:
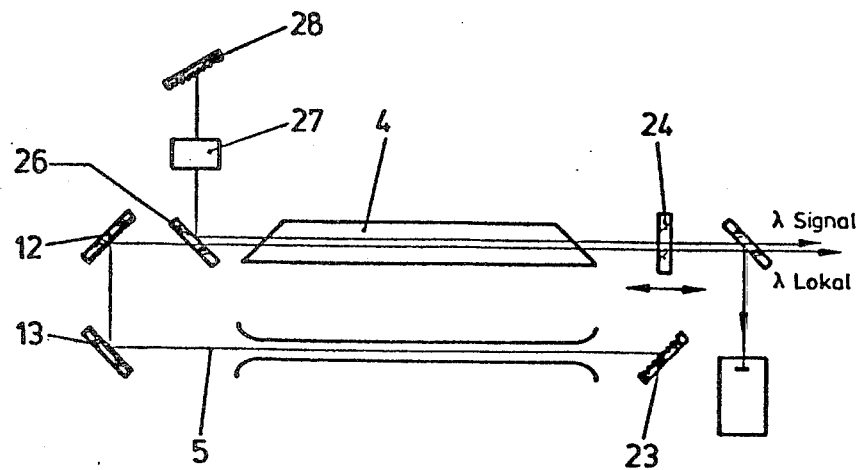
FIG. 3 represents an application of a laser of FIGS. 1 and 2 equipped with an absorber.

The hybrid laser 1 is composed of two laser units 4 and 5 which occupy the same housing 2 within a common resonator volume 3. The laser unit 4 is a reference laser, operated in CW or pulse operation, an injection laser or laser amplifier, which may be embodied as a waveguide laser or a continuous wave laser. It is used, for example, as a calibrating laser for frequency tuning of the resonator or, at the same time, as a local oscillator. The laser unit 5, on the other hand, is a TE laser or a longitudinally pulsed laser or a Q-switched laser for producing a laser pulse.

In actual construction, the system includes the tube 6 which is under low pressure and in which a continuous discharge is being maintained resulting in a continuous excitation of the laser. It is mounted with shock-proof mountings 16 and 17 wich are perpendicular to its long axis. Their beveled ends are equipped with Brewster windows 7 and 8, respectively, and the mountings have respective openings 19 and 20 at the appropriate level. The tube is surrounded by flat, perpendicular cooling fins 9. In another embodiment, not shown in the drawing, the cooling may be performed by a so-called heat pipe. This is a tube in which a medium is evaporated at one end and then flows in the liquid state back to the tube.

The radiation passing through the window 7 travels sequentially to the 45° mirrors 12 and 13 at the endface of the housing 2, causing a double deviation by 90° into the beam path of the laser 5 which has respective openings 21 and 22 at the end mountings 16 and 17. The radiation emanating from the laser 5 travels in the opposite direction into the beam path of the gas laser 4.

The laser unit 5, which may be embodied as a semi-waveguide laser (not shown), basically consists of the two opposite electrodes 14 and 15. Its interior space communicates though recesses 25 (FIG. 2) with the gas volume 3 so that both volumes have the same pressure. The blower 29 insures that the gas circulates through the recesses and along the cooling fins, as shown by the arrows, so that the same temperature prevails in both laser units.

Disposed at the endface 11, at the level of the opening 22 (FIG. 1) are the totally reflecting optical element 23, for example a mirror, and, at the level of the opening 20, the at least partially transmitting optical element 24, which serves to extract the beam and may be, for example, a suitable constructed mirror. In the embodiment of FIG. 3, an extractor element 26 is placed in the beam path between the laser unit 4 and the deviating mirror 12. This extractor guides the radiation via the absorber or polarizer 27 to the totally reflecting optical element 28, for example also a mirror, and thence back to the main beam path.

The embodiments of FIGS. 4 to 7 differ from those already described mainly by the central disposition of the laser unit 4. At the top and bottom, as seen in the figures, are disposed respective electrode pairs 14, 15 or 14', 15'. This construction requires a somewhat different disposition of the extracting, reflecting and deviating elements. For example, in the case of FIG. 4, at the endface 10, the electrode channels are delimited by the two deviating mirrors 12 and 13 and at the endface 11 by the window 31 which is transparent to light of wavelength $\lambda_1$ and by the totally reflecting mirror 23. The elements 23 and 24 or 30 and 31 can be made tunable. The optical channel of the tube 6, however, is defined at the endwall 10 by the totally reflecting optical element 30, e.g., a mirror, and at the endwall 11 by the mirror 24 which is transparent to light of wavelength $\lambda_2$.

Figure 6:
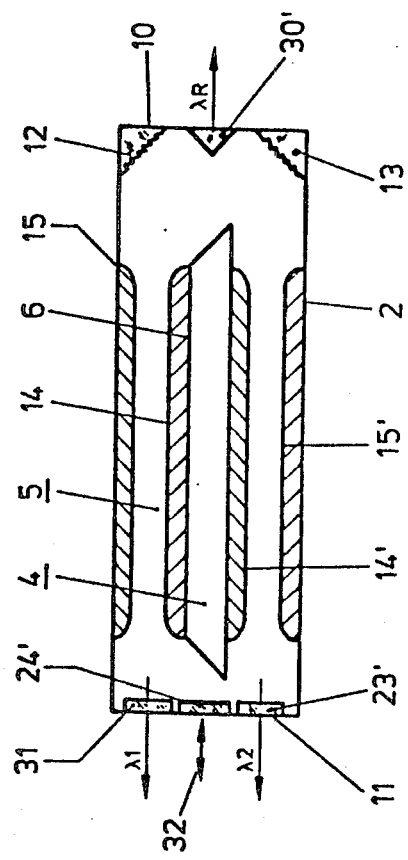
FIG. 6 is a variant of the lasers in FIGS. 4 and 5.

In the case of FIG. 6, the totally reflecting mirror 23 at the endface 11 is replaced by the window 23' which is transparent to light of wavelength $\lambda_3$ and at the endface 10, the totally reflecting mirror 30 is replaced by the element 30' which partly deviates the radiation by 90° toward 12 and 13 and partly extracts it at the wavelength $\lambda_R$. A piezoelectric transducer 32 can move the endface 11 in the longitudinal direction when needed.

Figure 7:
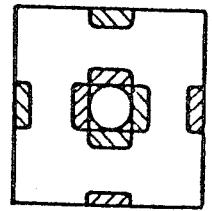
FIG. 7 shows a possible crossection for the laser of FIG. 6 with a quadruply folded beam path in the gas laser.
Figure 4:
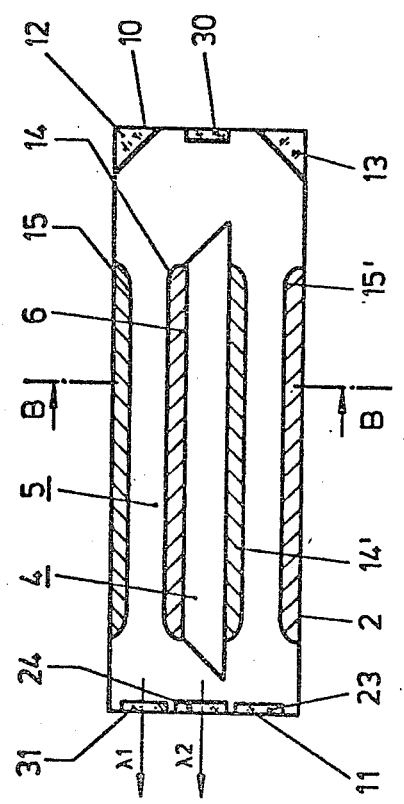
FIG. 4 is a lengthwise section through a hybrid laser of symmetrical construction.

FIG. 7 illustrates a possible cross-section of the embodiment of FIG. 6 with quadruple folding of the beam path of the gas laser. Of course, more numerous foldings of the beam, although not shown in the drawing, are possible without departing from the scope of the invention.

Figure 8:
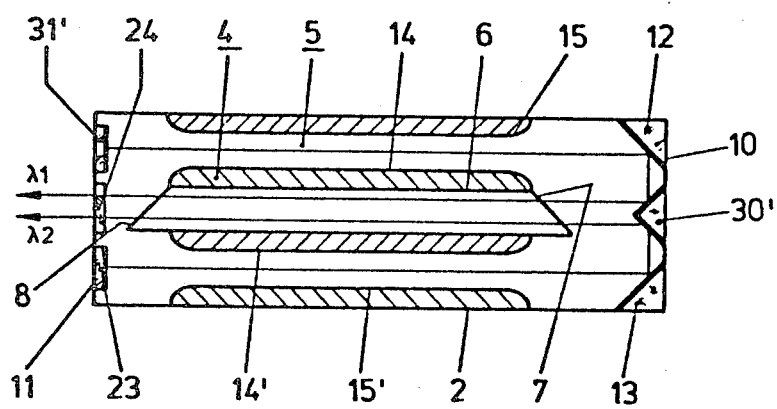
FIG. 8 shows another variant of the laser in FIGS. 4 and 5.
Figure 5:
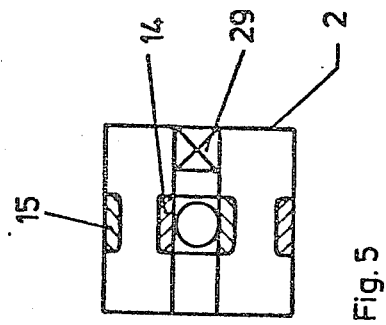
FIG. 5 is a section along BB in FIG. 4.

Finally, FIG. 8 illustrates the possibility of continuing to guide the radiation injected in the tube 6 into the channels formed by the electrodes 14, 15 or 14', 15', via the deviating means 30' and 12 or 13. However, thereafter, the total radiation, together with the radiation produced there, is reflected by the totally reflecting mirror 23 or 31' in the opposite direction through the tube 6 and through the window 24 in the endwall 11 which is transparent for light of wavelengths $\lambda_1$ and $\lambda_2$, to the outside. The endfaces of the tube on both ends are again covered by respective Brewster windows 7 and 8.

We claim:

1. A hybrid laser system, comprising:
   (a) low-pressure means for defining a first resonator volume containing an active media under low pressure and having first and second end faces;
   (b) high pressure means for defining a second resonator volume containing an active media under high pressure and containing said low-pressure means and having third and fourth end faces,
   (c) excitation means for exciting said active media in said low pressure means to generate laser energy;
   (d) a pair of electrodes for exciting said active media at high pressure to generate laser energy, said electrodes being disposed in said high pressure means between said third and fourth ends, said electrodes being disposed in facing spaced relationship to each other;
   (e) coupling means associated with said first and third ends for coupling radiation exiting from said first end to said third end, and for coupling radiation from said third end to said first end to form an optical train between said second and fourth ends in which first laser activity occurs in said low-pressure means and second laser activity occurs in said high pressure means, said first and second laser activity occurring in coherent super position;
   (f) partly reflecting extraction means for outputing said laser energy positioned adjacent one of the ends of said optical train; and
   (g) reflecting means positioned adjacent the other end of said optical train.

2. A hybrid system according to claim 1, wherein said first resonator volume comprises a reference laser.

3. A hybrid laser system according to claim 1, wherein said second resonator volume comprises a transversely excited laser.

4. A hybrid laser system according to claim 1, wherein said second resonator volume defines a second laser which is excited by a second pair of confronting electrodes, and said second resonator volume lies substantially parallel to said first resonator volume and said second resonator volume communicates with said first resonator volume via perforations.

5. A hybrid laser system according to claim 4, wherein said extraction means comprises first and second at least partially transmitting optical elements for extracting beams of first and second wavelengths, respectively, said first at least partially transmitting optical element being aligned with said second resonator volume and said second at least partially transmitting optical element being aligned with said first resonator volume.

6. A hybrid laser system according to claim 1, wherein said totally and partially reflective elements adjacent said second and fourth ends respectively are displaceable along the longitudinal axis of said housing.

7. A hybrid laser system according to claim 6, wherein said displacement of both of said totally and partially reflective elements is caused by means of a piezoelectric transducer.

8. A hybrid laser system according to claim 1, wherein said first and second resonator volumes generate radiation of first and second wavelengths, respectively, and said first and second wavelengths are separately tunable and mutually fixed.

9. A hybrid laser system according to claim 1, wherein said first resonator volume operates in a continuous wave mode.

10. A hybrid laser system according to claim 1, wherein said cooling means comprises a gas-liquid heat exchanger.

11. A hybrid laser system according to claim 1, wherein said extraction means comprises a polarization-dependent element located in the beam path between said first laser and said coupling means.

12. A hybrid laser system according to claim 11, wherein a beam extracted by said polarization-dependent element is passed through a selective absorber or polarizer and onto a diffration grating.

13. A hybrid laser system according to claim 1, wherein said first and second laser activity occur at the same wavelength.

14. A hybrid laser system as in claim 1, further comprising means for circulating the active media under high pressure between said electrodes and around said low pressure means to promote a uniform temperature distribution between said high pressure means and said low pressure means.

15. A hybrid laser system according to claim 14, wherein said means for circulating comprises a blower located in said resonator chamber.

16. A system as in claim 14, further comprising means associated with said low pressure means for contacting said active media under high pressure and conducting thermal properties of said active media under high pressure to said low pressure means and said active media under low pressure.

17. A hybrid laser system as in claim 14, wherein said first and second laser activity occur in substantially parallel directions.

18. A hybrid laser system as in claim 14, wherein said coupling means comprises a pair of mirrors, one of said mirrors being associated with said first end and the other of said mirrors being associated with said third end and each of said mirrors directing laser energy received from the other of said mirrors into its associated resonator volume.

19. A hybrid laser system, comprising:
(a) low-pressure means for defining a first resonator volume containing an active media under low pressure and having first and second end faces;
(b) high pressure means for defining a second resonator volume containing an active media under high pressure and containing said low-pressure means and having third and fourth end faces, said second resonator volume comprising a longitudinally pulsed laser;
(c) excitation means for exciting said active media in said low pressure means to generate laser energy;
(d) a pair of electrodes for exciting said active media at high pressure to generate laser energy, said electrodes being disposed in said high pressure means between said third and fourth ends, said electrodes being disposed in facing spaced relationship to each other;
(e) coupling means associated with said first and third ends for coupling radiation exiting from said first end to said third end, and for coupling radiation from said third end to said first end to form an optical train is formed between said second and fourth ends in which first laser activity occurs in said low-pressure means and second laser activity occurs in said high pressure means, said first and second laser activity occurring in coherent super position.
(f) partly reflecting extraction means for outputting said laser energy positioned adjacent one of the ends of said optical train; and
(g) reflecting means positioned adjacent the other end of said optical train.

20. A hybrid laser system, comprising:
(a) low-pressure means defining a first resonator volume for containing an active media under low pressure and having first and second end faces;
(b) high pressure means defining a second resonator volume containing an active media under high pressure and for containing said low-pressure means and having third and fourth end faces, said second resonator volume comprising a Q-switched continuous wave laser;
(c) excitation means for exciting said active media in said low pressure means to generate laser energy
(d) a pair of electrodes for exciting said active media at high pressure to generate laser energy, said electrodes being disposed in said high pressure means between said third and fourth ends, said electrodes being disposed in facing spaced relationship to each other;
(e) coupling means associated with said first and third ends for coupling radiation exiting from said first end to said third end, and for coupling radiation from said third end to said first end to form an optical train is formed between said second and fourth ends in which first laser activity occurs in said low-pressure means and second laser activity occurs in said high pressure means, said first and second laser activity occurring in coherent in super position,
(f) partly reflecting extraction means for outputting said laser energy positioned adjacent one of the ends of said optical train; and
(g) reflecting means positioned adjacent the other end of said optical train.

* * * * *